Aug. 7, 1934.  R. P. RICHARDSON  1,969,425
TRIMMER SAW
Filed Jan. 10, 1934   3 Sheets-Sheet 2

Inventor
Robert Paul Richardson
By
Attorney

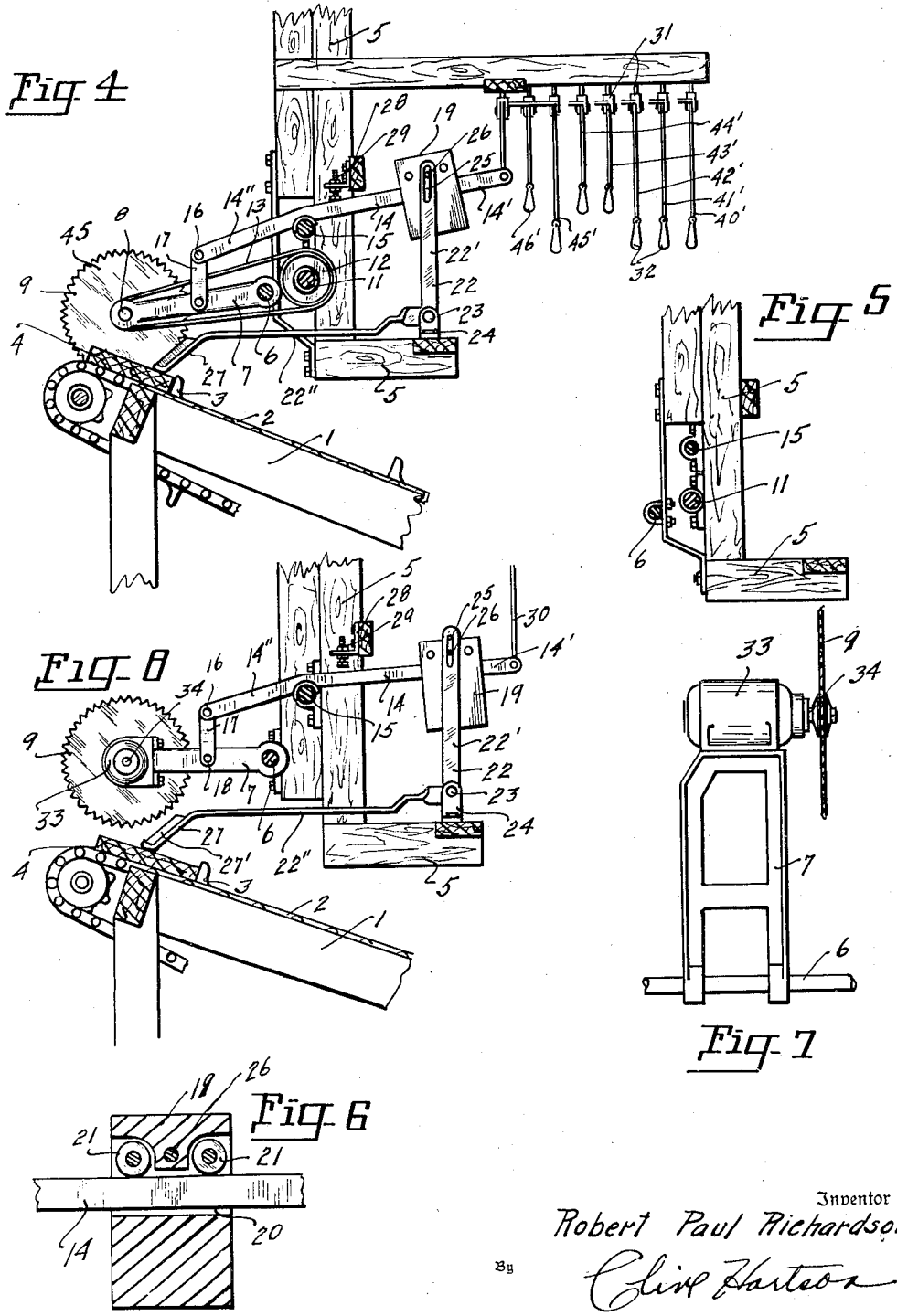

UNITED STATES PATENT OFFICE 1,969,425

TRIMMER SAW

Robert Paul Richardson, Toledo, Oreg.

Application January 10, 1934, Serial No. 706,033

9 Claims. (Cl. 143—41)

The present invention relates to improvements in trimmer and like saws mounted upon horizontally pivoted or vertically rocking arms or frames which are designed to move such saws into or out of sawing position. The invention particularly has to do with a new and novel mechanism for actuating, controlling and regulating the rocking movement of saw supporting frames which are pivoted or fulcrumed for raising and lowering.

The invention specifically relates to a semiautomatic control mechanism for moving a trimmer saw into or out of sawing position. This is accomplished by a variable counterweight mechanism embodying a counterweight balance lever supporting the saw frame. This lever is provided with a counterweight which is movable therealong. The weight when moved in one direction causes the lever to move the frame out of sawing position, and when moved in the reverse direction the effect of the counterweight is lessened sufficiently to permit the saw frame to over balance it, thereby allowing the frame to return the saw to its normal or predetermined sawing position. This counterbalancing effect or action is increased or decreased by a counterweight control lever which is actuated by the products that are caused to travel beneath the saw. When the lever is engaged by such products, it moves the weight to a position where it causes the counterbalance lever to raise the saw frame out of sawing position, such products passing beneath the saw untouched thereby. In connection with the means for raising the saw frame just mentioned, a manual control device is also provided which when actuated nullifies the action of the moving counterweight and causes the saw to remain in sawing position.

This invention is especially adapted to operate saws in multiple mounting in connection with a trimmer table having chains, belts or other suitable means for carrying lumber. The saws are mounted at predetermined spacings above the table. Normally the saws are in the line of travel of boards carried upon the table, but, unless nullified by the manual control mechanism, do not engage the boards as they are raised thereabove by the shifting of the counterweight which is occasioned by the counterweight control lever engaging the boards, thus causing the counterbalance lever to raise the saws.

The prime object of invention is to provide a variable counterweight mechanism for raising and lowering trimmer saws, and saw supporting arms designed for vertical raising and lowering.

Another object of the invention is to provide a mechanism for raising and lowering trimmer and like saws operating upon the variable counterweight principle whereby sudden starts, stops, are eliminated.

Another object of the invention is to provide a mechanism for raising and lowering trimmer and like saws which readily permits such saws to be operated in batteries or multiple.

Another object of the invention is to provide an automatically adjusting counterbalance mechanism for raising and lowering trimmer and like saws which has a limited number of major parts, and in this instance but three, thereby assuring positive operation and avoiding unnecessary breakdowns.

Another object of the invention is to provide a mechanism of the character outlined which is inexpensive and easy to manufacture.

Another object of the invention is to provide a mechanism of the character outlined which may be readily substituted for other types of mechanisms utilized for raising and lowering trimmer saws.

Further objects of the invention will be readily ascertained on reading the specification following aided by the drawings, wherein:—

Figure 4 is the sectional side elevation indicated by section line 4—4 of Figure 1, and shows a saw being manually lowered to saw a board.

Figure 5 is an end elevation of the frame for supporting the saw arms.

Figure 6 is a sectional side elevation of the adjustable counterweight.

Figure 7 is a plan of saw utilizing an electric motor as its propulsive means.

Figure 8 is a side elevation of the view shown in Figure 7.

Figure 1:
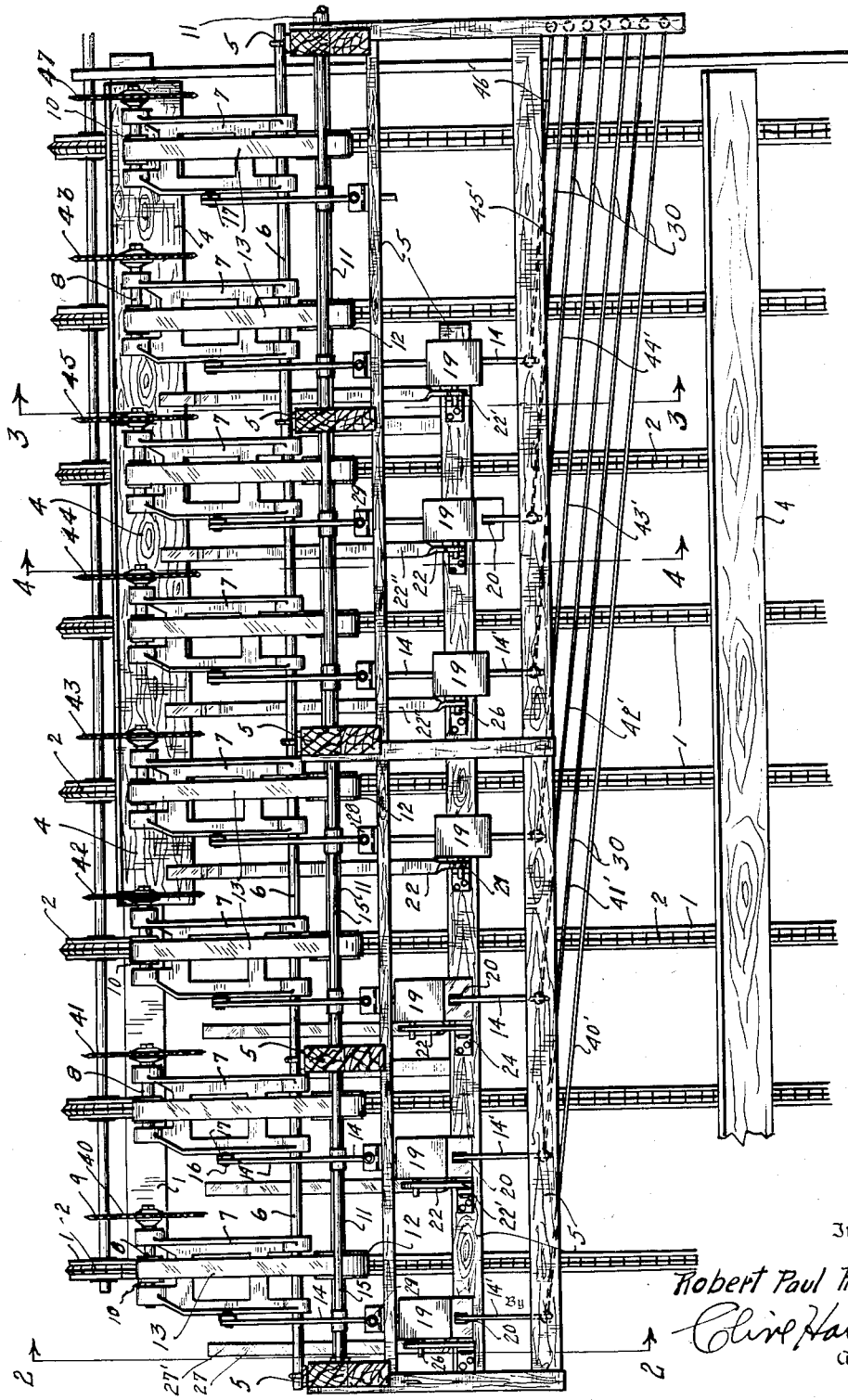
Figure 1 is a plan illustrating a battery or multiple mounting of trimmer saws utilizing the hereinafter described invention to raise or lower the saws.
Figure 2:
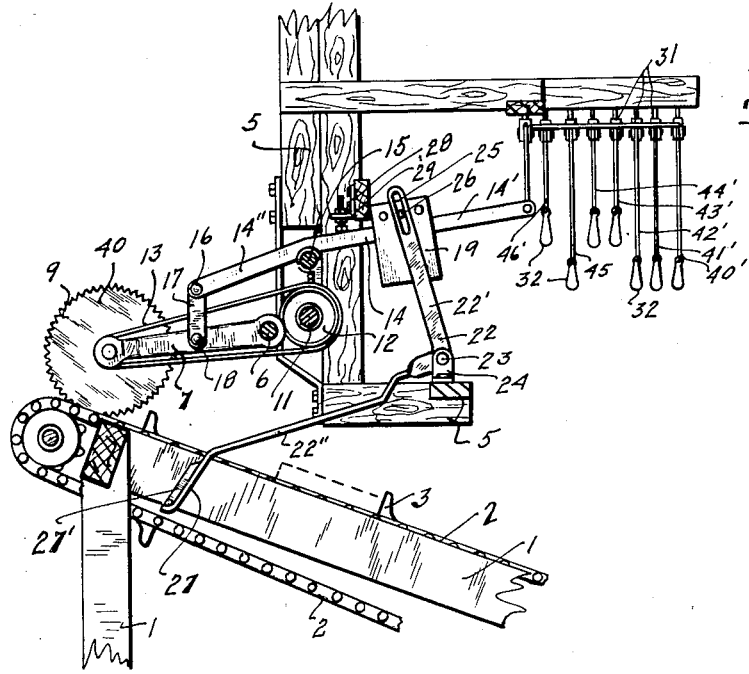
Figure 2 is the sectional side elevation, indicated by section line 2—2 of Figure 1, showing the saw in lowered position.

The present invention is primarily intended to be used in multiples for trimming lumber and in such installation they are operated in connection with a moving table designed to carry boards past the saws. In the present instance a cooperating table 1 is provided. This table has carrier sprocket chains 2 which are provided with board engaging lugs or dogs 3 designed to compel boards 4 to travel thereon. Above the table, and supported so that it does not obstruct the travel of lumber thereunder, is a supporting frame or truss 5. Frame 5 forms a support for each of the saw mountings. These mountings embody a fulcruming or supporting shaft 6 secured to frame 5. This shaft, if desired, may serve all the saw mountings. A rockable saw supporting frame 7 has one end pivotally connected or fulcrumed to shaft 6. The other end of member 7 is provided with suitable bores or bearings to receive arbor 8 to which is secured the saw 9. In addition to saw 9 the arbor has mounted thereon the pulley 10. A driving shaft 11 is mounted to frame 5 and this shaft carries a number of pulleys 12 corresponding to the number of saws to be operated. Each pulley 10 is connected by a belt 13 to a pulley 12, thereby imparting rotation to each of the saws 9.

The pivotal connection of the frame 7 to shaft 6 permits the saw 9 to be vertically rocked toward or from the table 1. When moved toward the table, it is positioned in the line of travel of the boards 4 carried thereon, and of consequence will saw such boards. However, it is not desirable to permit the saw to remain in such position, and in order to automatically raise the saw, unless otherwise manually controlled, there has been provided the following mechanism.

This consists of a counterbalance arm 14 rockably mounted intermediate its length upon the shaft or spindle 15. The outer end 14" is connected by pin 16 to the link 17, which link in turn is connected by pin 18 to the arm 7. Positioned upon the other end portion 14' of the counterbalance arm 14 is an adjustable counterweight 19, provided with an aperture 20 extended therethrough, and in which resides the portion 14', thereby allowing such counterweight to be moved toward or from spindle 15 which constitutes the fulcrum of member 14. In order to aid in such movement, weight 19 is provided with two rolls 21, which travel on such arm.

Figure 3:
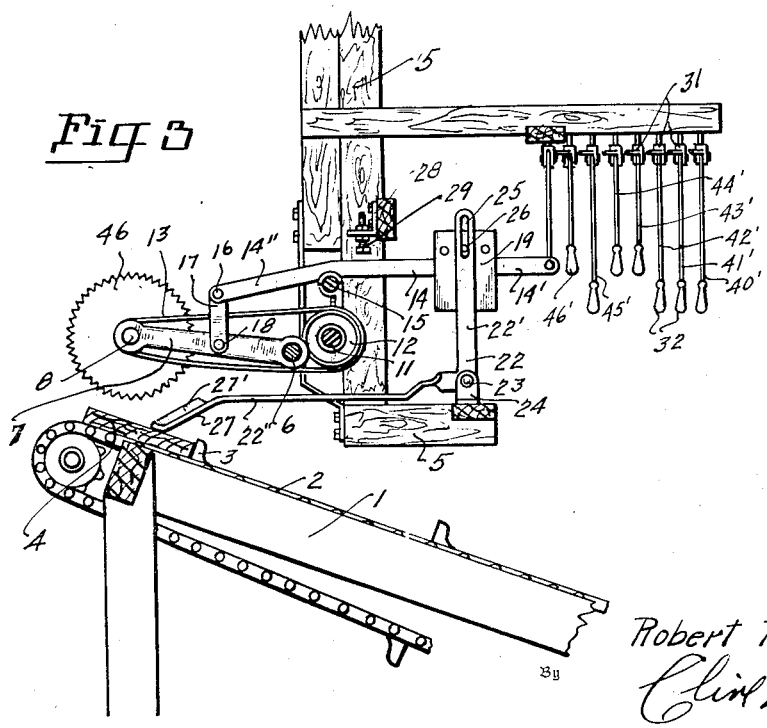
Figure 3 is the sectional side elevation, indicated by section line 3—3 of Figure 1, showing the saw being raised by the counterweight actuating lever being operated by a board.

It is to be understood from the foregoing description that when weight 19 is moved away from the fulcrum of arm 14 this will cause the lower end 14' to lower or move downwardly, and consequently the opposite end 14" to rise, thereby causing arm 7 to rise by reason of the before mentioned link connection. On the other hand, when weight 19 is moved toward the fulcrum, portion 14' becomes over-balanced by the weight of the arm 7 upon portion 14", thereby allowing arm 7 and the connecting end of arm 14 to lower, and thus permitting the saw 9 to resume sawing position. In order to automatically move the counterweight 19 there is mounted to frame 5 a counterweight control lever 22. Lever 22 has an upright portion 22' and a horizontal portion 22". The counterweight control lever or bell crank 22 is pivoted at its elbow 22''' upon the pin 23, pin 23 being journaled within the sporting bracket 24 which is mounted upon the frame 5. The upright or vertical arm 22' has a slot 25 which constitutes a guideway and fits about pin 26 projecting from the weight 19. The outer end of the horizontal arm 22" is downturned to form a runner 27. Runner 27 is provided with a counterweight 27'. Runner 27 is normally positioned in the line of travel of the boards 4, and is engaged thereby, and when so engaged the boards travel under the downturned portion of runner 27, thereby forcing it and arm 22" upwardly and arm 22' to the right, as viewing Figures 3 and 4, thereby causing or forcing weight 19 outwardly on counterbalance arm 14, thus, in turn, causing that portion of the arm to lower and the portion 14 to raise, and consequently raising saw 9 out of the line of movement of the boards 4. This action is repeated with respect to each of the boards traveling upon the table 1, the saw rising before and lowering after each board, unless such action is nullified by the hereinafter described manual operating means. In order to limit the downward movement of the saw arm 7, a stop mechanism is provided, which consists of a bracket 28 secured to frame 5, in which is threaded a stud or bolt 29. This bolt is in line to be engaged by the portion 14' of arm 14, and unthreading said bolt will limit the amount of upward movement of 14' and consequently limit the amount of downward movement of portion 14" and arm 7.

From the foregoing it will be seen that the saws are automatically raised above the line of travel of the boards carried by the table 1. However, it will be found necessary to lower certain of the saws so that they engage and saw the boards as they travel past, and in order to do so there is provided a simple operating mechanism comprising a cable or cord 30, which has one end attached to the end of the portion 14' of lever 14. Cord 30 extends through a chain of pulleys 31 or other suitable guides to the operator's platform. In order to cause the saw to engage and saw a board, end 32 of the cord 30 is held or grasped, thereby resisting downward movement of the portion 14' of lever 14, thereby retaining the saw 9 in its sawing position, or, in the event that the saw is in raised position, pulling the end 32 of the cord 30 downward will lower the saw into sawing position, where it is held as the board or boards to be sawn pass thereby.

Figure 1 is a plan view of a multiple mounting of trimmer saws embodying the present invention. They are indicated each in individual entirety by the numbers 40 to 47 inclusive. These saws are manually controlled by cords 30, each cord being indicated by the number of the saw which it controls with an added prime mark. Thus is saw 43 to be manually operated, when cord 43' is pulled. While in Figure 4, it will be seen that cord 45' is being pulled in order to maintain saw 45 in sawing position, the board 4 being partially sawn.

Again observing Figure 1 it will be noted that the ends of a board 4 are being sawn off by the saws 42 and 47. This operation trues up or squares the rough cut ends of such boards, and is in most instances automatic, this by reason of the fact that the saw raising mechanism of the end saw 47 has been eliminated so that the saw does not raise above the advancing board, while on the other hand, board 4 does not engage the saw raising arm 22" but its end does extend sufficiently to be sawn by the saw 42. To properly utilize this feature the boards delivered to the trimmer saws are slightly longer, as is the board 4 being sawn, than their final or finished dimensions; it being understood that the spacings between saw 47 and each or at least certain of the other saws conforms to predetermined dimensional standards, so that the same result is obtained with respect to boards which are longer or shorter than the one being sawn.

Figures 7 and 8 illustrate a modification of the invention just described in that a drive shaft 11 is dispensed with and the pulleys 10 and 12 are eliminated, a motor 33 secured to the free end of arm 7 being substituted therefor. In this instance the saw 9 is mounted directly to the armature shaft 34.

In the foregoing description the means for manually controlling the saws may be modified somewhat by providing a system of levers to be substituted for the control cords, the levers being connected to the saws by cords, wires, links or other suitable means.

Having described my invention, I claim—

1. The combination with a lumber conveyor or trimmer table of a rockably mounted saw arm positioned above such table, a saw mounted on said arm and normally positioned to intercept the lumber carried upon said table, a counter-balance arm connected to said saw arm, an adjustable counter-weight mounted upon the counter-balance arm and designed to be moved back and forth thereon, a counter-weight control lever connected to said counter-weight, said counter-weight control lever having a portion intercepting the lumber on said table and being engaged thereby, said lever when so engaged moving said counter-weight whereby said counter-balance lever moves the saw arm to a position where said saw does not intercept the lumber, and an optionally operated control device operable to maintain the saw in intercepting position.

2. The combination with a lumber conveyor or trimmer table of a saw arm mounted to be rocked to and from said table, a saw carried by said arm including means for driving said saw, a fulcrumed counter-balance arm connected to said saw arm, a counter-weight on said counter-balance arm adjustable to and from its fulcrum, said counter-balance arm controlling the position of the saw with regard to said table and normally permitting it to rest in the line of travel of the lumber thereon, said weight when moved away from said fulcrum causing said counter-balance arm to move the saw arm to a position where said saw is without the line of travel of the lumber on said table, a counter-weight control lever connected to said counter-weight and positioned to be engaged by the lumber traveling on said table, said counter-weight control lever when so engaged moving the counter-weight from said fulcrum whereby said counter-balance lever moves the saw out of the line of travel of the lumber, and means optionally operable to retain the saw in the line of travel of lumber.

3. The combination with a lumber conveyor or trimmer table of a saw arm mounted to be rocked to and from said table, a saw carried by said arm including means for driving said saw, a fulcrumed counter-balance arm connected to said saw arm, a counter-weight on said counter-balance arm movable to and from its fulcrum, said counter-balance arm controlling the position of the saw with regard to said table and normally permitting it to rest in the line of travel of the lumber thereon, said weight when moved away from said fulcrum causing said counter-balance arm to move the saw arm to a position where said saw is out of the line of travel of the lumber on said table, a pivoted member designed to move said weight back and forth, said member being engaged by the lumber traveling on said table and when so engaged moving said counter-weight from the fulcrum of the counter-balance lever whereby the saw is moved from the line of travel of the lumber, and means for nullifying the action of the pivoted member whereby the saw is maintained in the line of travel of the lumber.

4. The combination with a lumber conveyor or trimmer table of an upwardly swinging arm, a saw supported thereby, a fulcrumed counter-balance arm supporting the swinging arm including a weight movable to and from its fulcrum, a movable member engaging the lumber traveling on said table, said member being connected to said weight whereby when engaged by lumber it moves the weight away from said fulcrum causing said counter-balance arm to raise said swinging arm to permit the lumber to pass freely beneath the saw, and a member connected to said counter-balance arm optionally operable to restrain raising of the swinging arm.

5. The combination with a lumber conveyor or trimmer table of an upwardly swinging arm, a saw supported thereby and normally stationed in position to saw the lumber traveling upon said table, an adjustably counter-balanced arm designed to raise and lower the swinging arm, a movable control member for adjusting the counter-balancing effect of said arm, said control member engaging and being moved by the lumber carried on said table thereby operating to increase the aforesaid counter-balancing effect whereby the saw is raised to a position permitting the lumber to travel untouched therebeneath, and optionally operable control means operative to retain the saw in sawing position against the action of such control member.

6. The combination with a lumber conveyor or trimmer table of an upwardly swinging arm, a saw supported thereby and normally stationed in position to saw the lumber traveling on said table, an adjustable counter-balance designed to raise and lower the swinging arm including a counter-weight movably mounted thereon and constituting means whereby its counter-balancing effect may be increased or decreased for the purpose of correspondingly raising and lowering said arm, a lever operated by the lumber traveling on said table, said lever being connected to said counter-weight causing it to so increase and decrease said counter-balancing effect, and a manual control designed to retain the saw in sawing position against the operation of said lever.

7. In a trimmer saw, a pivoted saw supporting frame, a saw carried thereby including means for transmitting rotation to such saw, a rocking support member adapted to raise and lower said frame, a weight movable on said rocking support governing its raising and lowering of said frame, a rockable work engaging member connected to and governing the movement of said weight, said work engaging member when engaging work being actuated thereby and operating to compel said weight to move to a position wherein it causes said rocking support member to raise said frame and saw to a position above the work engaged thereby, and an optionally operable control operable to retain the saw in lowered position against the operation of the work engaging member.

8. In a trimmer saw, a pivoted saw supporting frame, a saw carried thereby including means for transmitting rotation to such saw, a pivotally mounted supporting bar having one end pivotally connected to said frame and adapted when rocked to raise and lower said frame, a movable weight mounted upon the other end of said supporting bar, said weight when moved in one direction causing said bar to raise said frame and when moved in the opposite direction, to lower said frame, a movable work engaging member connected to and governing the movement of said weight, said work engaging member when engaging work being moved thereby and simultaneously moving said weight to a position wherein it operates to cause said supporting bar to raise said frame and saw to a position above the work engaged thereby, and an optionally operable control operative to retain the saw in lowered position against the operation of the work engaging member.

9. The combination with a lumber conveyor or trimmer table of a saw adapted for raising and lowering, a counter-balancing means connected with and operable to raise and lower said saw, a counter-weight movably incorporated in and controlling the operation of said counter-balancing means and its movability causing said counter-balancing means to raise or lower said saw accordingly as it is moved in one direction or the opposite, a rockable member engaging said counter-weight to move it as aforesaid, said rockable member being engaged by the lumber traveling upon said table and when so engaged moving said counter-weight in a direction which causes the counter balancing means to raise the saw above the lumber engaged thereby, and optionally operable means operative to secure the counter-balancing means against raising said saw.

ROBERT PAUL RICHARDSON.